United States Patent
Teia Dos Santos Mendes Gomes

(10) Patent No.: US 9,719,424 B2
(45) Date of Patent: Aug. 1, 2017

(54) FLOW GUIDING SYSTEM, TURBO ENGINE WITH A FLOW GUIDING SYSTEM AND METHOD FOR MANUFACTURING A FLOW GUIDING SYSTEM

(71) Applicant: Rolls-Royce Deutschland Ltd & Co KG, Blankenfelde-Mahlow (DE)

(72) Inventor: Luis Daniel Teia Dos Santos Mendes Gomes, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 306 days.

(21) Appl. No.: 14/584,242

(22) Filed: Dec. 29, 2014

(65) Prior Publication Data
US 2015/0275759 A1    Oct. 1, 2015

(30) Foreign Application Priority Data

Dec. 31, 2013   (EP) ...................................... 13199861

(51) Int. Cl.
*F02C 7/057* (2006.01)
*F01D 17/08* (2006.01)
(Continued)

(52) U.S. Cl.
CPC ............ *F02C 7/057* (2013.01); *F01D 17/085* (2013.01); *F01D 25/12* (2013.01); *F02C 7/04* (2013.01);
(Continued)

(58) Field of Classification Search
CPC ........ F01D 17/085; F01D 25/12; F01D 5/081; F01D 9/023; F01D 9/065; F02C 7/04; F02C 7/042; F02C 7/057; F02C 7/08; F02C 7/14; Y02T 50/676; Y10T 29/49323; F05D 2260/209
See application file for complete search history.

(56) References Cited

U.S. PATENT DOCUMENTS 3,099,423 A * 7/1963 Wilde .................. B64C 29/0058
244/12.3
3,292,864 A * 12/1966 Edkins .................... B64C 15/02
239/265.19

(Continued)

FOREIGN PATENT DOCUMENTS

CN        103375244        10/2013

OTHER PUBLICATIONS

European Search Report dated Jun. 24, 2014 from European Application No. 13199861.9.

*Primary Examiner* — Woody Lee, Jr.
*Assistant Examiner* — Behnoush Haghighian
(74) *Attorney, Agent, or Firm* — Shuttleworth & Ingersoll, PLC; Timothy J. Klima

(57) ABSTRACT

The invention relates to a flow guiding system for a turbo engine, in particular an aircraft engine, characterized by an air intake device taking a thermal management air stream from a free flowing air stream during the operation of the turbo engine and at least one flow guiding means for guiding the thermal management air stream to at least one target region to be thermally managed in the turbo engine. The invention also relates to a turbo engine with a flow guiding system and a method for manufacturing a flow guiding system.

12 Claims, 15 Drawing Sheets

(51) Int. Cl.
  *F01D 25/12* (2006.01)
  *F02C 7/042* (2006.01)
  *F02C 7/14* (2006.01)
  *F02C 7/04* (2006.01)
  *F02C 7/08* (2006.01)

(52) U.S. Cl.
  CPC ............... *F02C 7/042* (2013.01); *F02C 7/08* (2013.01); *F02C 7/14* (2013.01); *F05D 2260/209* (2013.01); *Y02T 50/676* (2013.01); *Y10T 29/49323* (2015.01)

(56) References Cited

U.S. PATENT DOCUMENTS

| | | | |
|---|---|---|---|
| 4,203,566 A * | 5/1980 | Lord | B64D 13/00 |
| | | | 165/41 |
| 6,264,137 B1 | 7/2001 | Sheoran | |
| 6,349,899 B1 * | 2/2002 | Ralston | B64D 33/02 |
| | | | 244/53 B |
| 7,014,144 B2 * | 3/2006 | Hein | B64D 33/02 |
| | | | 244/53 B |
| 2003/0132344 A1 * | 7/2003 | Johnson | B64D 13/00 |
| | | | 244/118.5 |
| 2007/0193277 A1 | 8/2007 | Sheoran et al. | |
| 2009/0152406 A1 | 6/2009 | Francisco | |
| 2013/0333390 A1 * | 12/2013 | Barkowsky | F01D 17/105 |
| | | | 60/782 |

* cited by examiner

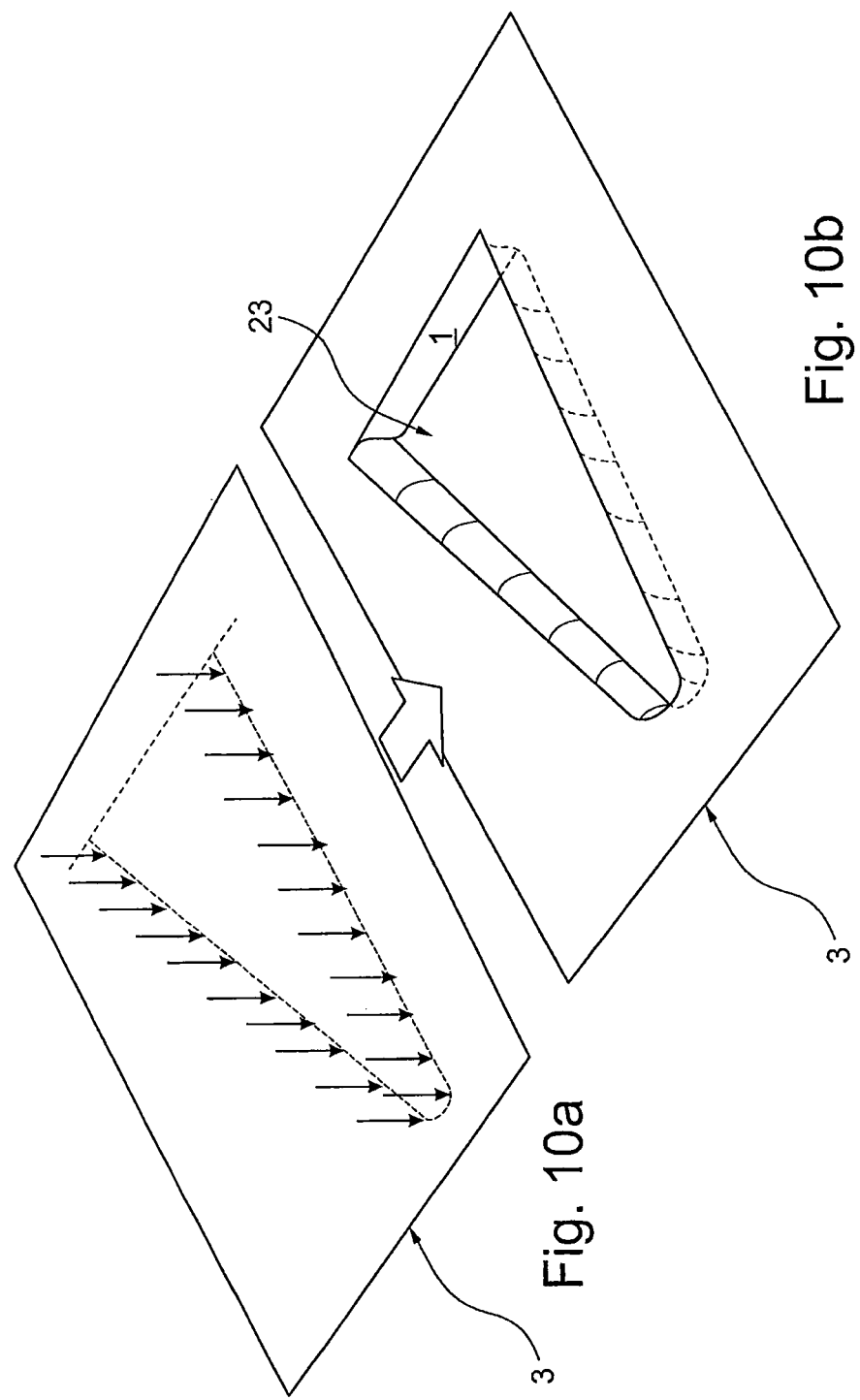

FLOW GUIDING SYSTEM, TURBO ENGINE WITH A FLOW GUIDING SYSTEM AND METHOD FOR MANUFACTURING A FLOW GUIDING SYSTEM

The invention is related to a flow guiding system with features as described herein, a turbo engine with a flow guide system with features as described herein and a method for manufacturing a flow guiding system with features as described herein.

In certain regions of turbo engines (e.g. gas turbines or aircraft engines) temperatures can be high during operation. Usually, within the turbo engines devices and/or structures are located which are sensitive to high temperatures. There are also instances for which a heating of certain areas in the turbo engine might be required, at least during some periods during the operation.

Therefore, an effective thermal management of the temperature sensitive regions and in particular the sensitive devices and/or structures within the turbo engine are necessary.

This problem is solved with a flow guiding system for a turbo engine, in particular an aircraft engine, with an air intake device taking a thermal management air stream from a free flowing air stream during the operation of the turbo engine and at least one flow guiding means for guiding the thermal management air stream to at least one target region to be thermally managed (i.e. cooled or heated) in the turbo engine. The free flowing air stream is a natural source of air which is guided by the air intake device and the at least one flow guide device to a target region. This flow guiding system does not necessarily require an extra source of cooling or heating medium.

Embodiments can comprise a cooling air stream or a heating air stream as thermal management air streams. In an embodiment for cooling the target region the free flowing air stream can e.g. be taken from a bypass stream in a turbofan engine and/or an ambient air stream outside the turbo engine. Since the bypass stream flows through the turbo engine, the relatively cold air can be effectively channeled towards the target region. Those air streams can be readily made available as heat sinks for cooling e.g. electronic devices in the turbo engine. In an embodiment for heating a target region an air stream taken from the core of the turbo engine can be used e.g. in the control of tip clearances.

In particular, the at least one flow guiding means comprises a guide surface which is oriented to deflect the incoming cooling air stream in the direction of the at least one target region, in particular a target device.

The cooling air stream can impinge on a flat guide surface, on an at least partially flat surface or on an at least partially concave guide surface of the at least one flow guiding means. The shape of the guide surface can be chosen as to the geometric requirements within the turbo engine. All this also comprises the possibility, that one incoming thermal management stream air stream is directed towards two or more target regions for which thermal management is required.

When the at least one flow guiding means comprises a guide surface with a triangular or trapezoidal base plate and lateral guide plates it is possible to diffuse the thermal management air stream so that a relatively large area can be heated or cooled. Then the thermal management air stream can be directed onto the triangular or trapezoidal base plate, in particular the apex of the triangular or trapezoidal base plate so that the thermal management air stream is diffused towards the at least one target region. With an air intake device and a triangular or trapezoidal flow guiding means it is possible to create a swirl which can be particularly efficient in the thermal management of target regions.

In another embodiment the at least one flow guiding means is integrated into a structure of the turbo engine, in particular a part of the surface of the core part of a turbofan engine or the casing radially outside the bypass duct of a turbofan engine. In the first instance this can be e.g. an outer wall of the core, which is in part shaped as a guide surface.

The at least one target region can comprise an electronic device, a coated section of the turbo engine, a core casing, a bearing, a connector, a plastic part, an actuator for vanes in the turbo engine, a movable part in the turbo engine, a fuel line, an oil line, and/or a sealing of the turbo engine. All these units require in particular a certain amount of cooling and/or heating.

For added flexibility the air intake device and/or the at least one flow guiding means are movably mounted and/or the at least one guide surface is movable to adjust the cooling air stream. A control system can be used to measure at least an engine operating parameter, in particular the shaft speed and/or a temperature, in particular the outside temperature, the temperature in the bypass duct, the temperature within the core, the temperature in the casing of the engine and/or strain measurement from a structural part, in particular in the at least one target region and/or outside the turbo engine. The at least one measured parameter is used to control the movement of the air intake device, the movement of the at least one flow guiding means and/or the shape of the guiding surface for adjusting the thermal management air flow to achieve a predetermined thermal management target (e.g. by keeping the temperature of a target region below a certain temperature).

An effective embodiment comprises an air intake device and/or at least one flow guiding device which are formed from one piece of a metal sheet.

In a further embodiment the air intake device protrudes into the free flowing air stream or is recessed from the free flowing air stream.

The problem is also solved by a turbo engine with features as described herein, in particular an aircraft turbo engine with at least one flow guiding system according to the present disclosure. The air intake devices can e.g. be positioned at walls to the bypass duct and/or outside the turbo engine. All these surfaces are exposed to free flowing air streams.

The problem is also solved by a method for manufacturing a flow guiding system according to the present disclosure, wherein
a) in a metal sheet a least one cut is made, so that afterwards
b) pressure is applied to at least one cut part of the metal sheet to form an air intake device and/or a flow guiding means.

Embodiments of the invention are described exemplary in the following figures.

Figure 4:
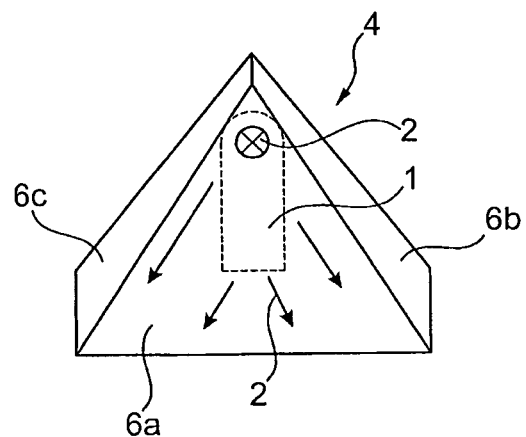
FIG. 4 shows a top view of a fourth embodiment of a flow guiding system with a triangular base plate.
Figure 5:
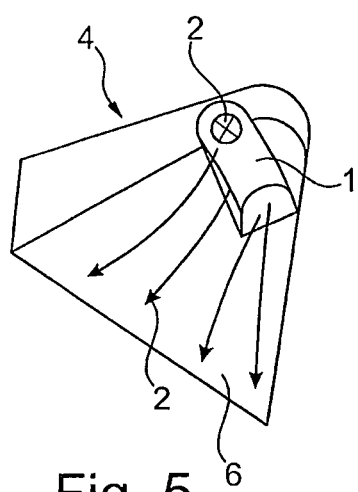
FIG. 5 shows a perspective view of a fifth embodiment of a flow guiding system.
Figure 7A:
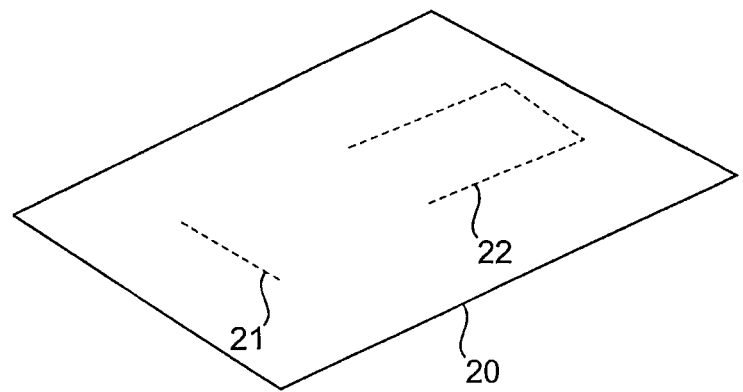
Figure 7B:
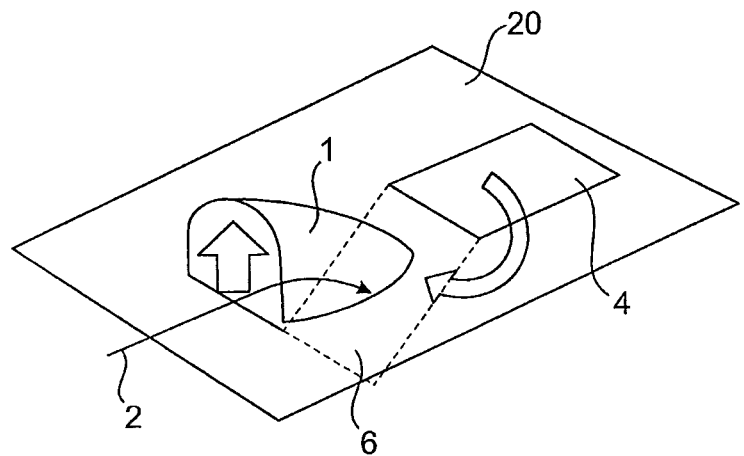
Figure 8A:
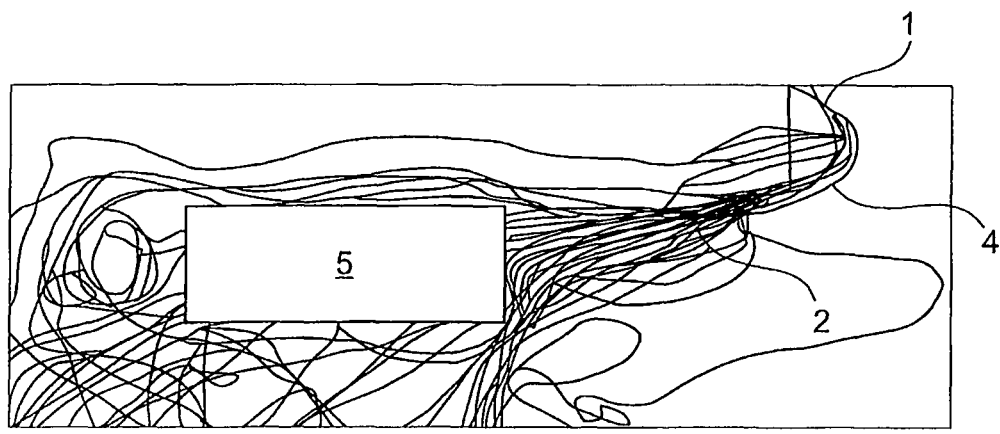
Figure 8B:
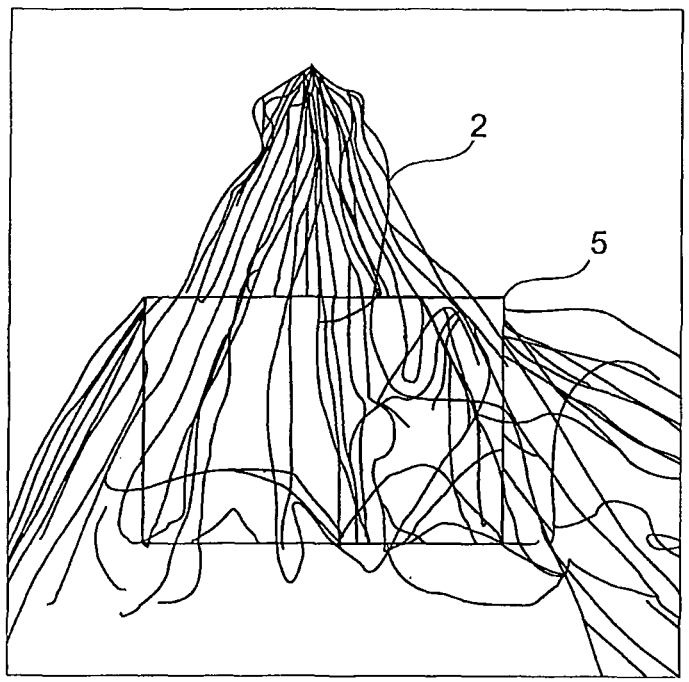
Figure 8C:
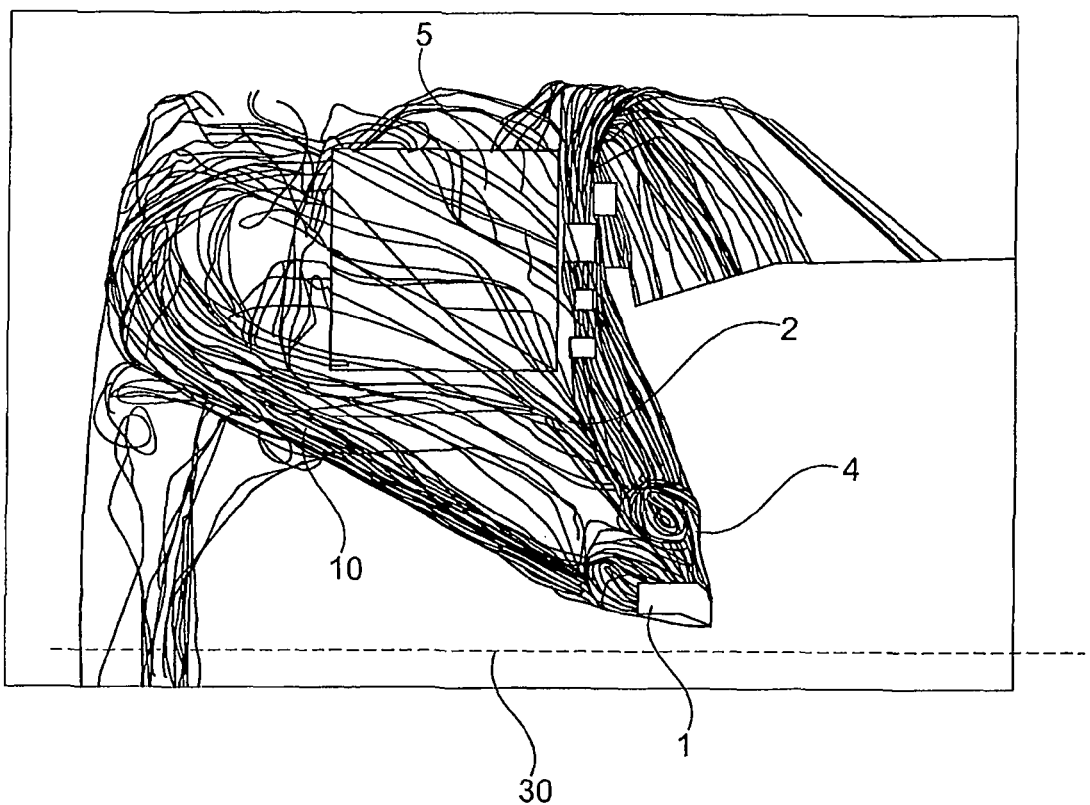
Figure 8D:
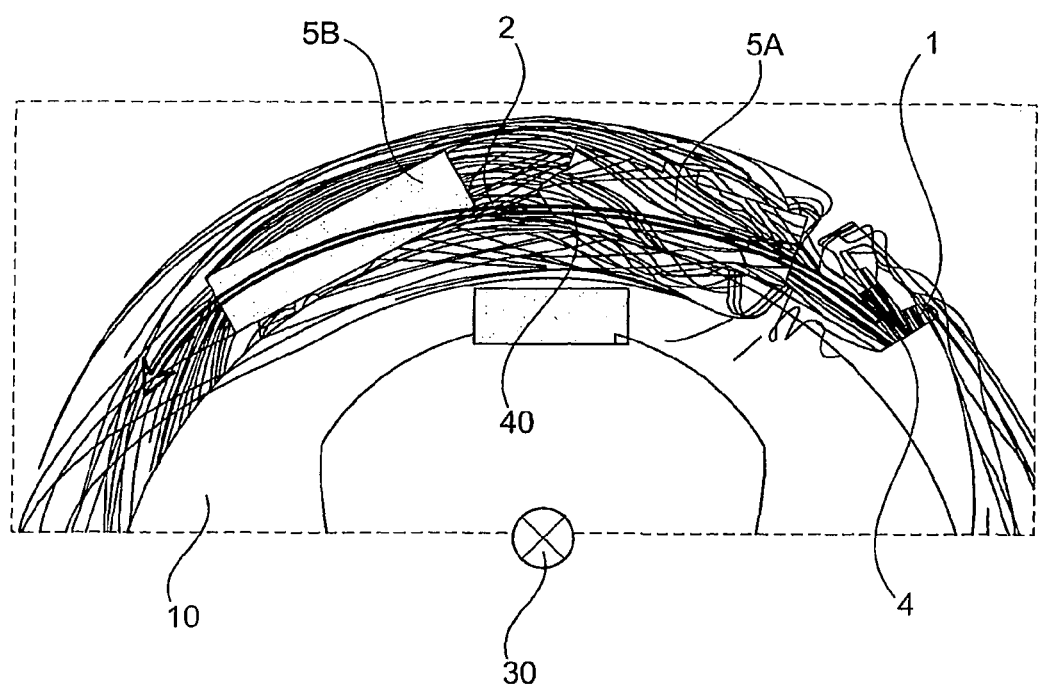
Figure 9A:
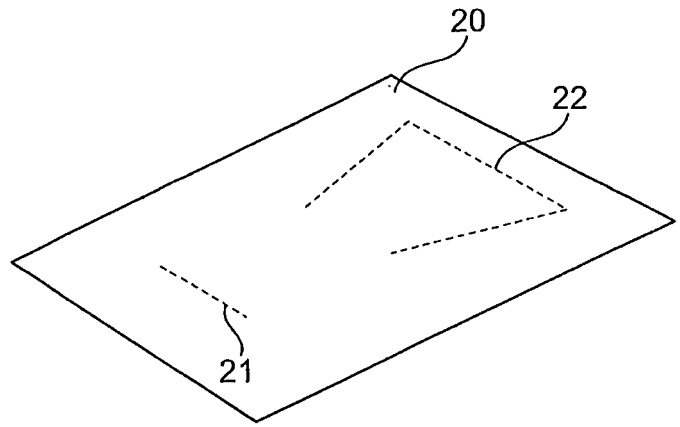
Figure 9B:
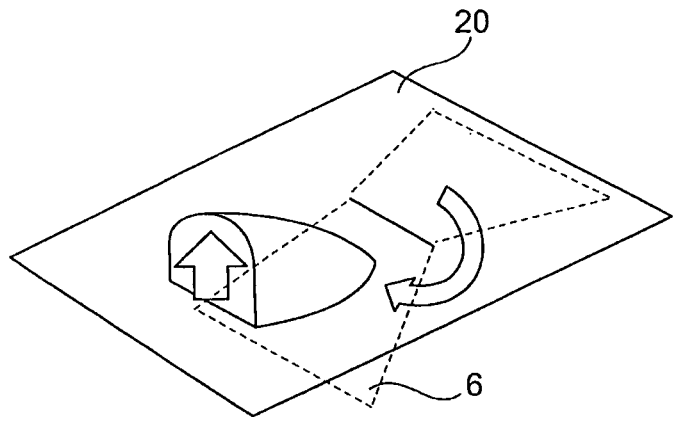
Figure 9C:
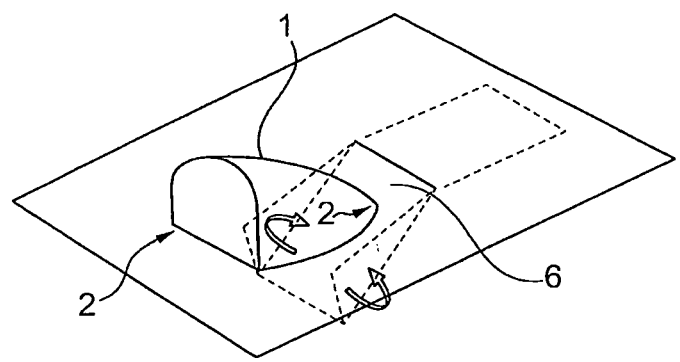
Figure 10C:
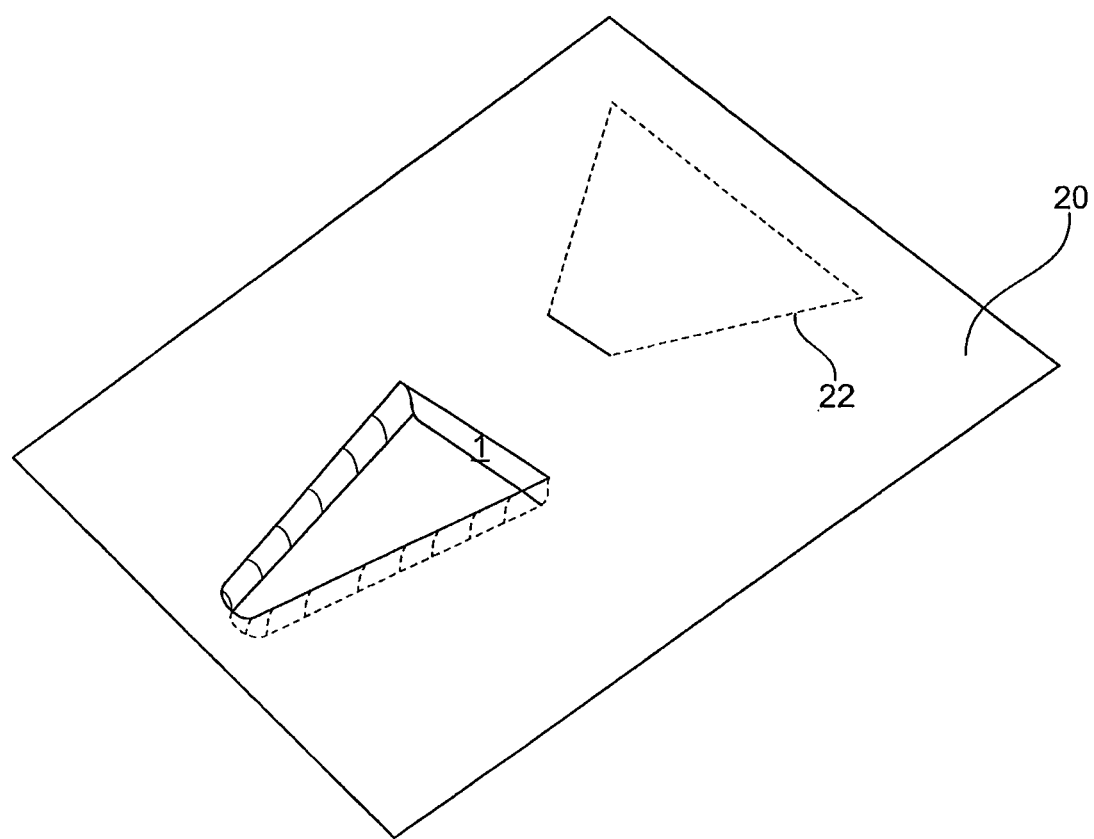
Figure 10D:
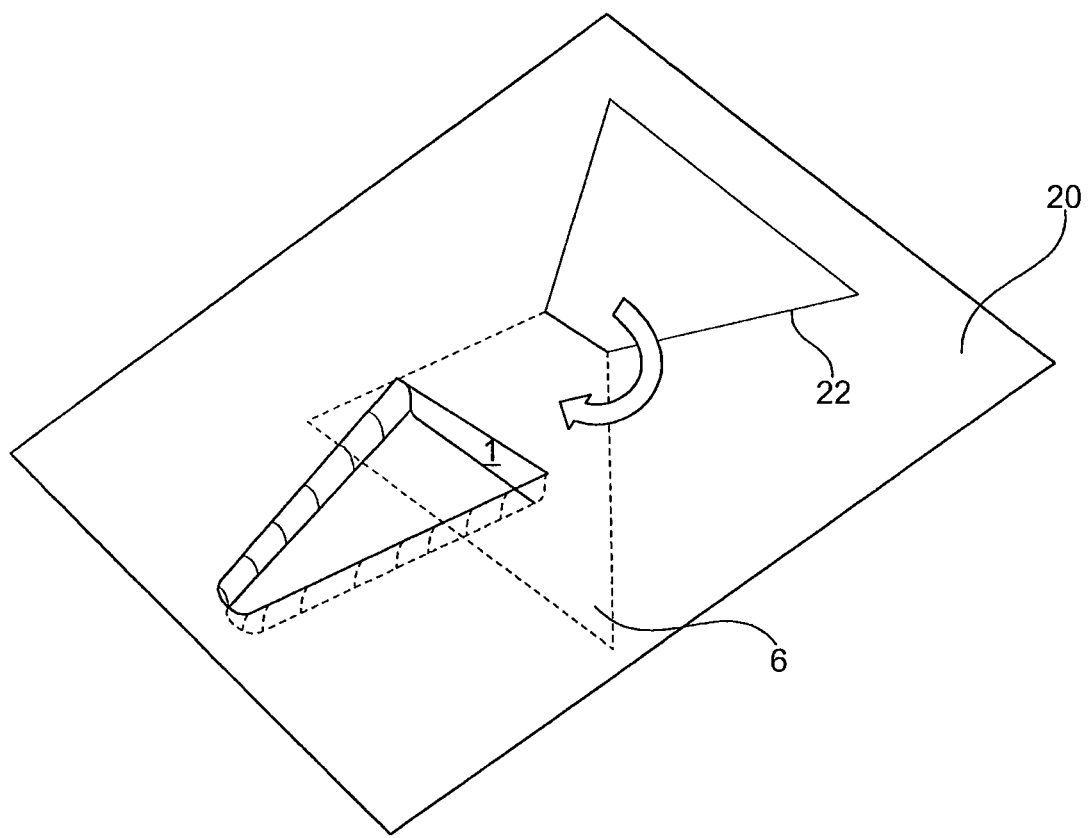
Figure 10E:
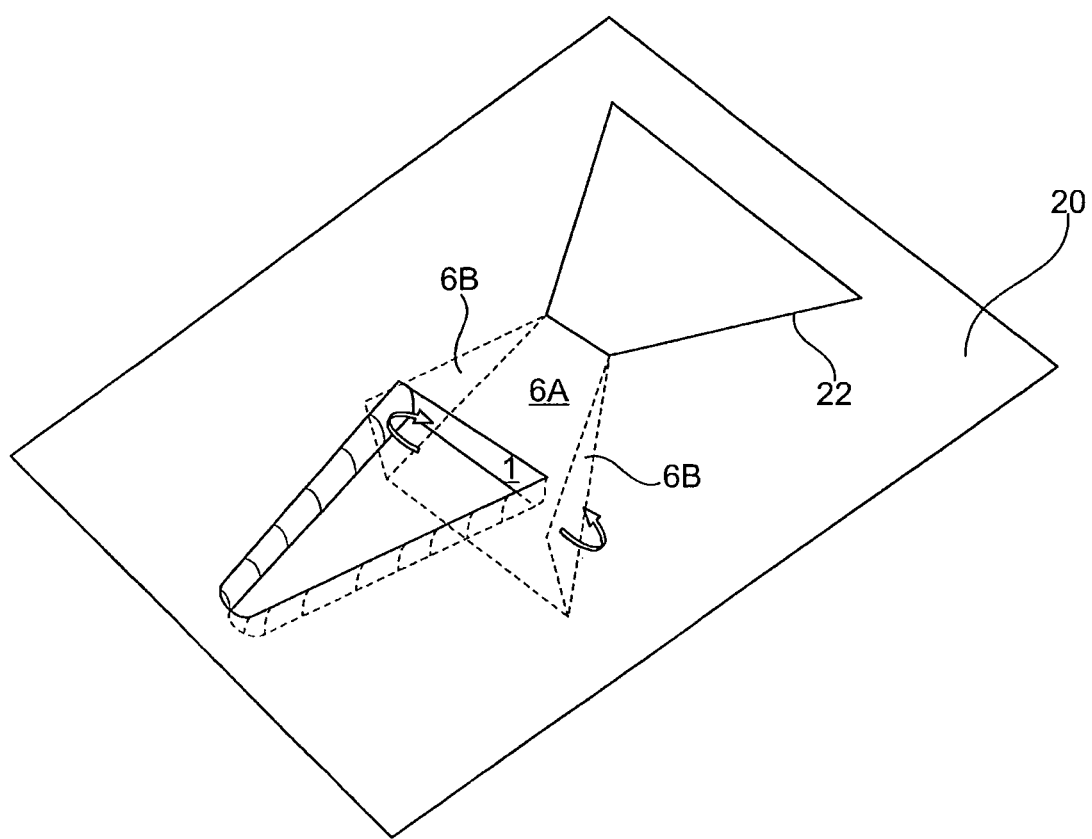
Figure 11A:
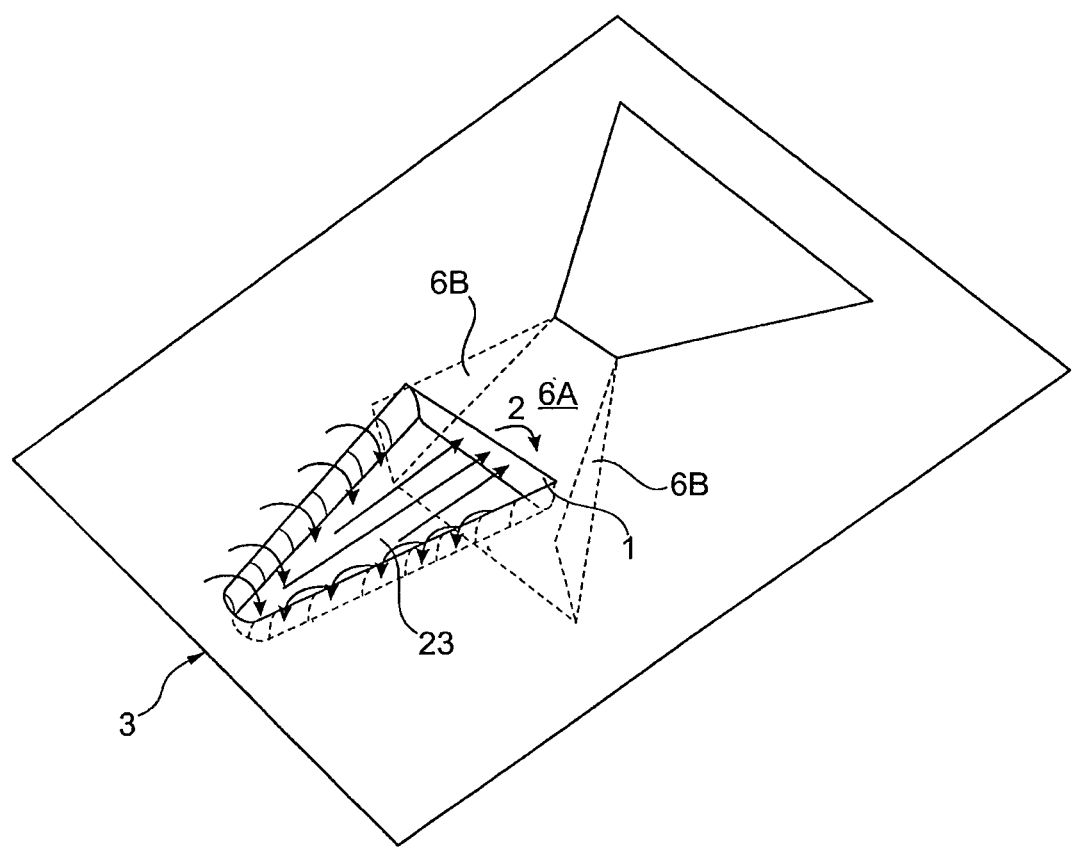

FIG. 7A schematically shows a first step in manufacturing an embodiment of a flow guiding system;

FIG. 7B schematically shows a second step in manufacturing an embodiment of a flow guiding system;

FIG. 8A shows a side view of a CFD simulation of the cooling air stream with an embodiment of the flow guide means according to FIG. 4;

FIG. 8B shows a top view of the CFD of the cooling air stream with an embodiment of the flow guide means according to FIG. 4;

FIG. 8C shows a side view of a CFD simulation of the cooling air stream with an embodiment of the flow guide means according to FIG. 5;

FIG. 8D shows a front view of a CFD simulation of the cooling air stream with an embodiment of the flow guide means according to FIG. 5;

FIG. 9A schematically shows a first step in manufacturing a further embodiment of a flow guiding system;

FIG. 9B schematically shows a second step in manufacturing a further embodiment of a flow guiding system;

FIG. 9C schematically shows a third step in manufacturing a further embodiment of a flow guiding system;

FIG. 10A, B schematically show the manufacture of an air intake device not protruding into the free flowing air;

FIG. 10C, D, E schematically show further steps in the manufacturing of a flow guiding systems;

FIG. 11A, B schematically show the functionality of the flow guiding system manufactured according to the embodiment shown in FIG. 10A-F.

Figure 1:
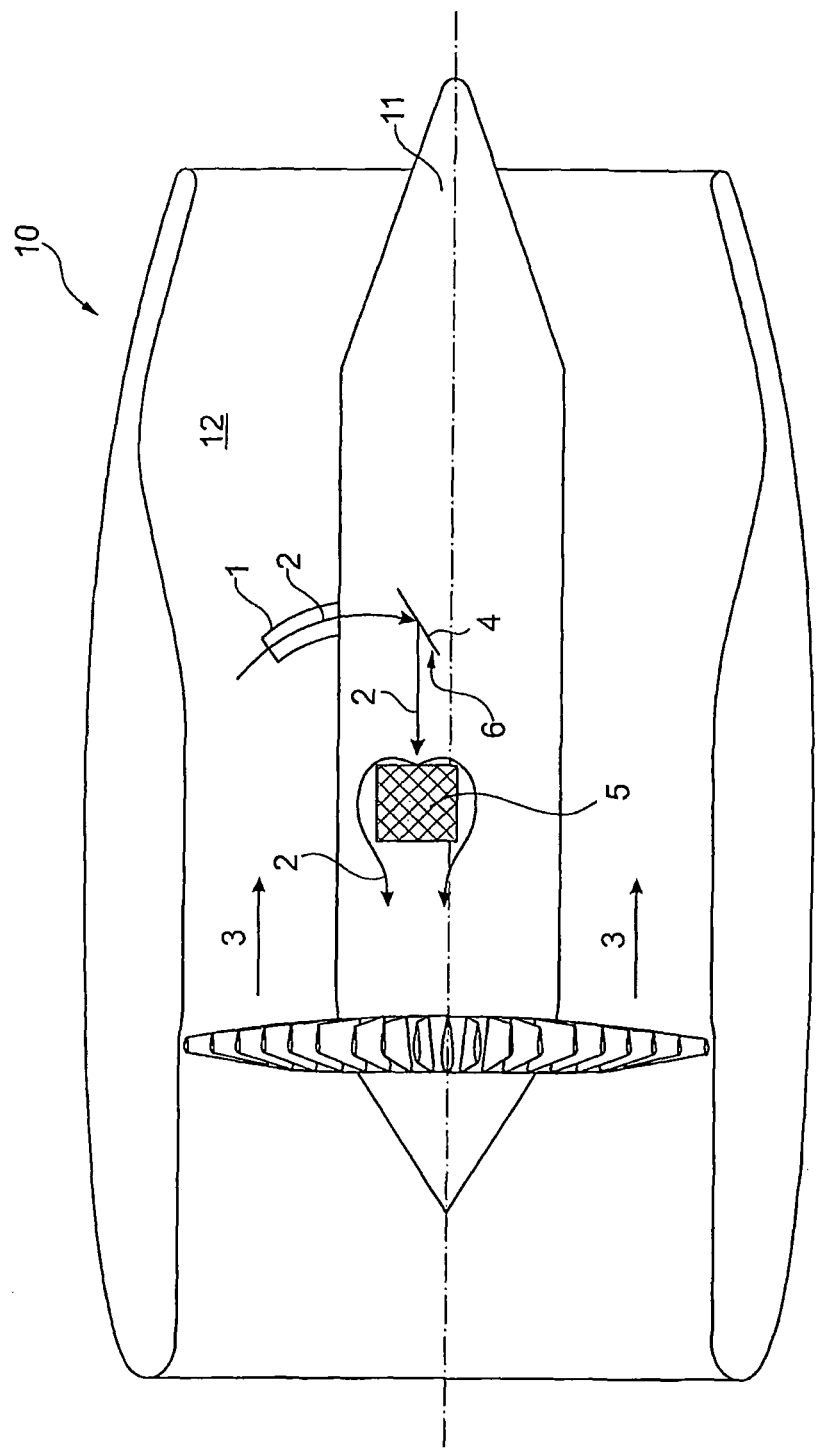
FIG. 1 shows a schematic cross-section of an aircraft engine with a first embodiment of a flow guiding system.

In FIG. 1 a turbofan engine 10 of an aircraft is shown as one example of a turbo engine 10. A bypass flow 3 is flowing along a core 11 through a bypass duct 12 of the engine 10. The bypass flow 3 is an example of a free flowing air stream, i.e. an air flow that is not confined to a tube. Another free flowing air stream 3 in the context of an aircraft is the flow around the fuselage of the aircraft, a hot air flow through an inner part of the turbo engine 10 or the airflow flowing around the engine 10 (both not shown in FIG. 1). In the following the thermal management is chiefly described in connection with the cooling of certain target regions 5 in the turbo engine 10. The thermal management can also include heating air streams 2, to heat certain parts of the turbo engine 10. Cooling air streams 2 and heating air streams 2 are examples of thermal management air streams 2. A control system 7 can be used control the thermal management of the turbo engine 10 by air flows.

The free flowing air stream 3 in the bypass duct 12 is generally not highly compressed and considerably cooler than many parts in or close to the core 11 of the engine 10. The core 11 of the turbo engine 10 comprises among other sections combustion chambers 13, a turbine 14 or a compressor 15 (see FIG. 3) which can cause high temperatures in certain parts of the engine 10 during operation.

In the schematic view of FIG. 1 it is assumed that a target region 5 needs to be cooled as one task in the thermal management of the engine 10. The target region 5 could e.g. comprise an electronic device which is sensitive to high temperatures. Other possible target regions 5 comprise bearings, a core casing, a sealing, a connector, a plastic part, an actuator for vanes in the turbo engine 10, a movable part in the turbo engine 10, a fuel line, an oil line, and/or a sealing of the turbo engine 10 or coated parts of the engine 10 which should not be subjected to high temperatures, at least for some period of time. The thermal management air streams 2, here the cooling air stream 2 can also result in a more homogeneous thermal load in the target region 5.

In other embodiments a hot thermal management air stream 2 would e.g. be directed towards target regions 5 which require heating. A hot air stream could e.g. be taken from the vicinity of the compressors 15 or the combustion chamber 13. The target region 5 could e.g. be the wall of the core 11 region close to the tips of the blades. Under certain circumstances, it can be necessary to heat those walls to prevent the mechanical contact of the rotating blades with the wall surrounding the blades.

The embodiment of the flow guiding system shown in FIG. 1 can effect a cooling of the target region 5 by using an air intake device 1 that channels a part of the free flowing air stream 3 (bypass air flow) into the core 11 of the engine. This part of the free flowing air stream 3—the cooling air stream 2—impinges on a flow guiding means 4 which in this embodiment comprises a flat surface 6. The cooling air stream 2 is then deflected from the guide surface 6 of the flow guiding means 4 towards the target region 5. In the case of e.g. an electronic device which is mounted in a casing, the cooling air stream 2 flows around the surfaces of the device to provide the cooling effect in the cooling region 5.

Hence, the flow guide system uses an air intake device 1 and the flow guiding means 4 to direct cool air from a free flowing air stream to the target region 5. As will become clear in connection with other embodiments, the geometry, the shape and/or the movement of the air intake device 1 and/or the flow guiding means 4 are used in directing the flow of the cooling air 2 towards the target region 5.

The first embodiment shown in FIG. 1 only uses one air intake device 1. In other embodiments more than one air intake device 1 is used. Such air intake devices 1 can be distributed symmetrically around the circumference of the core 11 of the engine 10 or the air intake devices 1 are located where they are close to the target region 5. It is also possible, that the cooling air 2 is impinging on more than one guide surface 6 so that two cooling air streams 2 are leaving the flow guiding device in different directions.

The air intake device 1 in the first embodiment is shown as a sort of scoop with an opening towards the free flowing air stream 3 in the bypass duct 12. In other embodiments, the air intake device 1 has a different shape, such as e.g. slit which is raised into the free flowing air stream 3.

Figure 2:
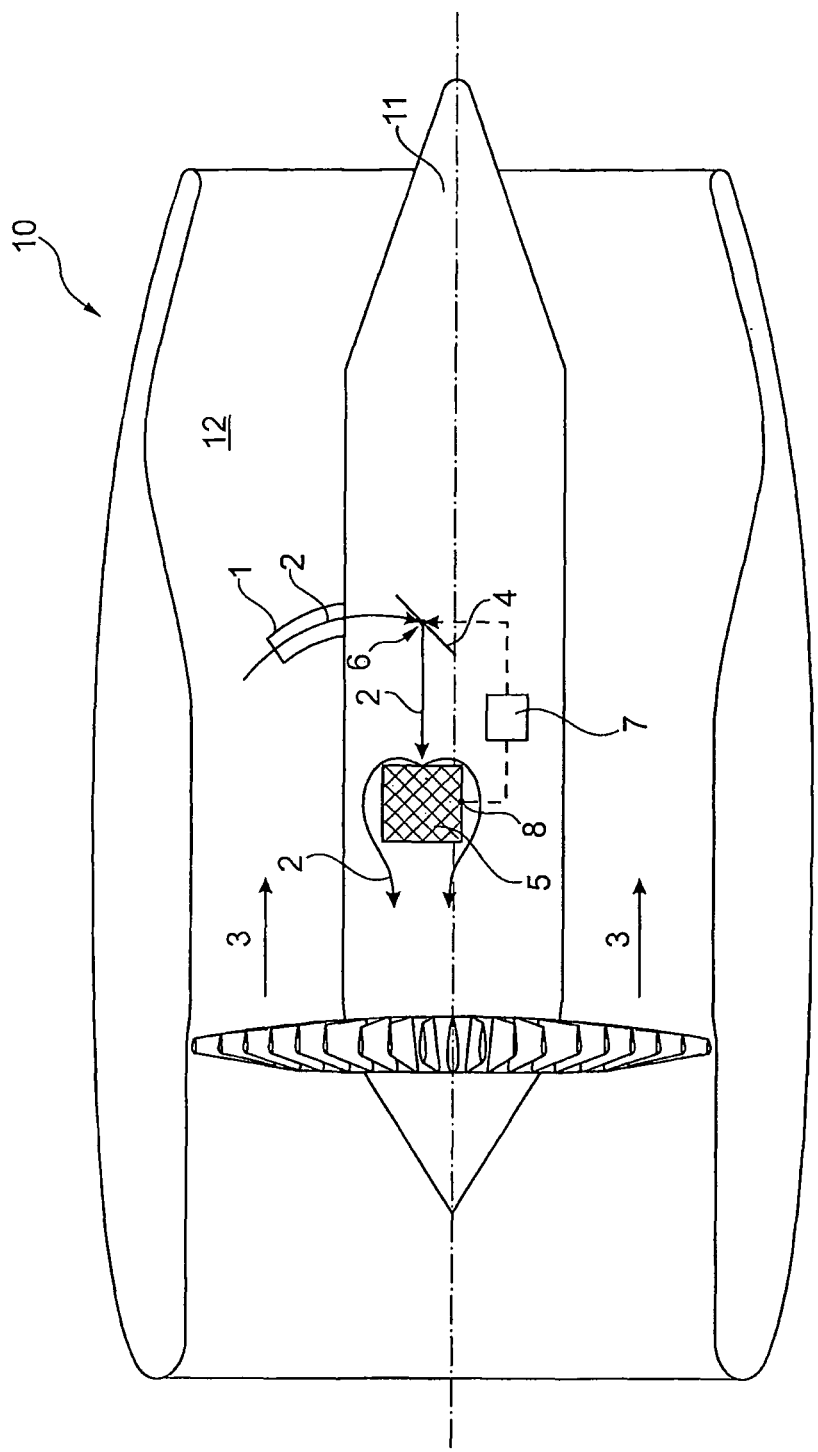
FIG. 2 shows a schematic cross-section of an aircraft engine with a second embodiment of a flow guiding system with a movable flow guide means.

In FIG. 2 a variation of the first embodiment is shown, so that reference can be made to the above description. As in the first embodiment, the flow guiding means 4 comprises a flat surface 6 which is mounted within the core 11. In the second embodiment the flow guiding means 4 is movably mounted within the core 11. Since the orientation of the surface 6 of the flow guiding means can be changed, the direction of the cooling air stream 2 can be changed. Therefore, the target region 5 can be subjected to an adaptable cooling load depending on the way the cooling air stream 2 impinges on the target region 5. It is also possible that the cooling air stream 2 is directed to more than one target region 5, by adjusting the flow guiding means 4 e.g. in a yaw-movement, pitch-movement and/or roll-movement.

The movement of the at least one flow guiding means 4 can be achieved in a number of ways. The movement can be preset to follow a certain pattern. It also can operate in a feedback loop, as shown in FIG. 2. Here, a temperature is measured by a temperature sensor 8 in the target region 5. In dependence of this measurement, the orientation of the guide surface 6 is adjusted by a control system 7. In this variation an especially efficient cooling of the target region 5 is possible.

In addition or alternatively, the air intake device 1 is mounted movably so that the cooling air stream 2 can be adjusted. It is also possible, that the flow guiding means 4 is stationary but the guide surface 6 as a whole or in parts is movable to provide an adjustable directional flow for the cooling air stream 2.

In both embodiments described above, the flow guiding means 4 comprise a flat guide surface 6 so that the impinging cooling air stream 2 is essentially reflected. In other embodiments the guide surface 6 of the flow guiding means 4 has a more complex shape (see e.g. FIGS. 3 and 4).

Figure 3:
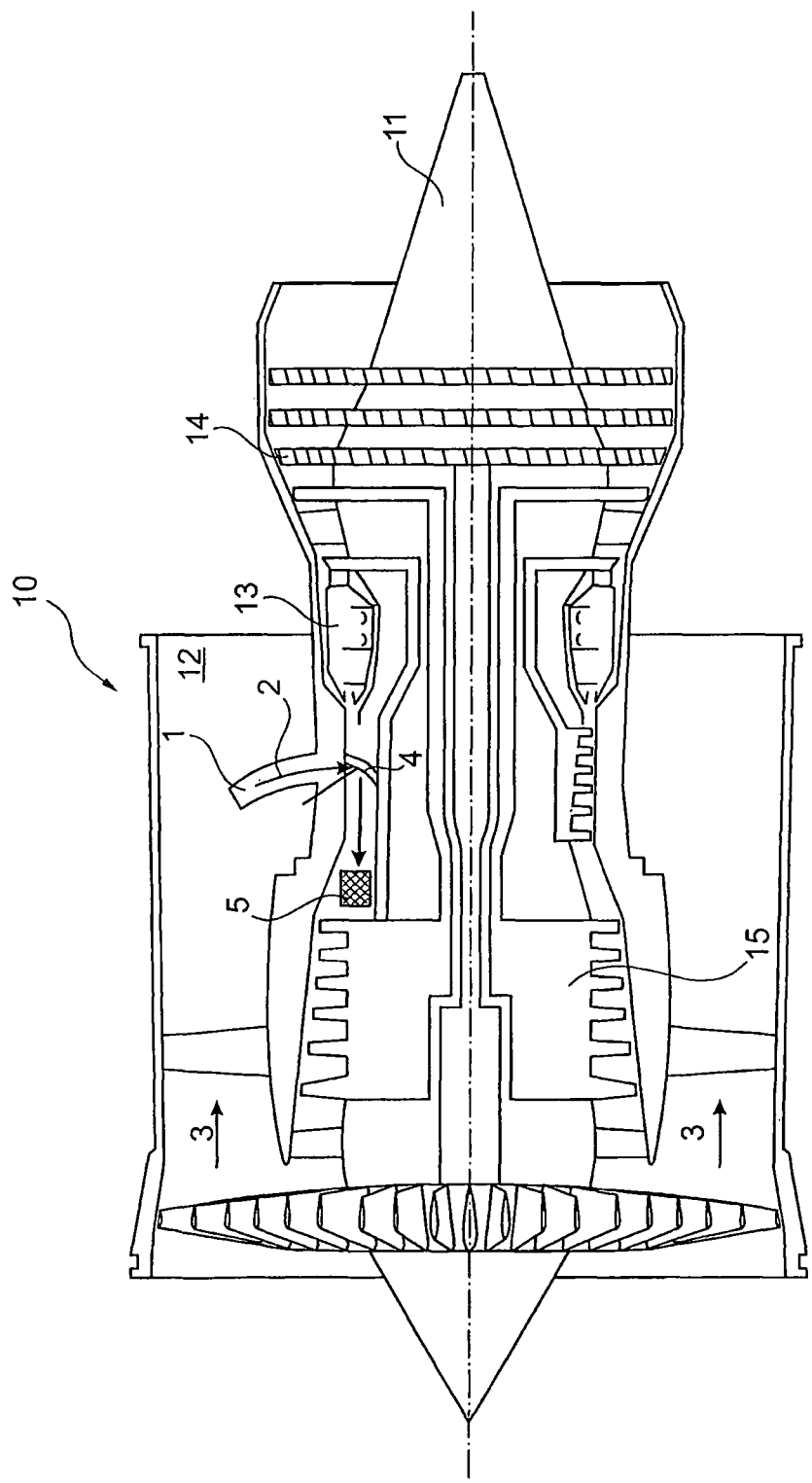
FIG. 3 shows a schematic cross-section of an aircraft engine with a third embodiment of a flow guiding system with flow guide means integrated with the core of the engine.

A third embodiment shown in FIG. 3 is a further variation of the first and second embodiment, so that the above description is applicable as well. In the third embodiment the guide surface 6 is essentially concave, so that the impinging cooling air stream 2 can be deflected towards the target region 5 in a different manner. Furthermore, the flow guiding means 4 and the guide surface 6 are here formed inherently with a part of the core 11 of the engine 10, so that the flow guiding means 4 is not a separate part. Therefore, the flow guiding means 4 is integrated into the structure of the core 11. The integration of the flow guiding means 4 into the engine 10 allows a compact design.

Another complex shape for the flow guiding means 4 is shown in FIG. 4 without the other parts of the engine 10. Here, the flow guiding means 4 comprises a triangular base plate 6a and two lateral guide plates 6b, 6c. The cooling air stream 2 is directed downwards into the apex of the triangular base plate 6a. From there, the cooling air stream 2 fans out as indicated by the arrows. Depending on the opening angle of the triangular base plate 6a the cooling air stream 2 can be more or less diffused onto the target region (not shown in FIG. 4 but in FIGS. 8a and 8b). In a variation of this embodiment, the triangular shape of fluid guiding means 4 can be adjusted e.g. by a control system 7 as described in the context of FIG. 2.

In FIG. 5 a variation of the embodiment shown in FIG. 4 is depicted. Here the flow guiding device 4 is tilted relative to the air intake device 1 in a yaw-direction. The cooling air stream 2 is directed towards one side of the turbo engine 10 (when looking to the front of the engine 10). Here the flow guiding means 4 are fixed. In other embodiments the flow guiding means 4 can comprise moving parts, e.g. a movable air intake device 1 and/or a movable guiding surface 6.

In FIGS. 4 and 5 essentially flow guiding device 4 with a triangular base plate 6 are shown. Similarly a base plate 6 with a trapezoidal shape can be used in further embodiments.

Figure 6:
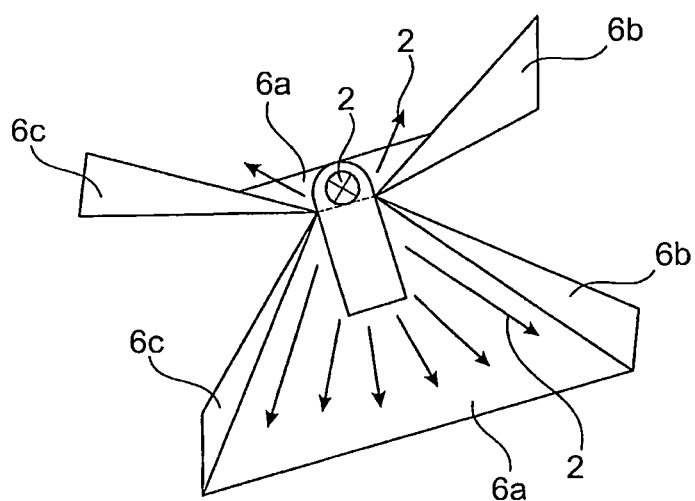
FIG. 6 shows a perspective view of a sixth embodiment of a flow guiding system with two flow directions for the cooling air stream.

FIG. 6 shows a variation of the flow guiding means 4 having two triangular base plates 6a with lateral guide plates 6b, 6c in a perspective view. The two triangular base plates 6a are joined at their respective apex. The air intake device 1 which is located above the two triangular base plates 6a. The cooling air stream 2 is impinging in the ridge where the triangular base plates 6a are joined so that the cooling air stream 2 fans out along both triangular base plates 6a as indicated by the arrows.

In FIGS. 7A and 7B the manufacturing of a flow guiding system is shown in a schematic way. FIG. 7 shows a part of a metal sheet 20 which will become part of the wall of the core 11 of the turbo engine 10. Two cuts 21, 22 are made into the metal sheet 20 as indicated by the dotted lines.

In FIG. 7B it is shown how these cuts 21, 22 can be bent into an air intake device 1 and a flow guiding means 4. The air intake device 1 is manufactured by pressing the metal sheet 20 into the direction indicated by the arrow along the first cut 21 which is a straight line. The second cut 22 is essentially U-shaped. If the metal sheet 20 is pressed downwards in this part—as indicated by the arrow—and bent for about 135°, an essentially flat flow guiding means 4 is formed. In other embodiments the metal sheet is bent more than 90°.

A cooling air stream 2 entering the air intake device 1 will impinge on that flat guide surface 6 so that it can be directed towards a target region (not shown in FIG. 7A, 7B). The advantage of this method is that no extra parts needs to be manufactured and/or mounted within the core of the engine 10.

The metal sheet 20 is shown here as a flat piece. Since the wall of the core 11 curved, the metal sheet 20 might be curved as well. The cuts 21, 22 can be introduced into flat or curved sheets.

Using cuts 21, 22 with a different shape, a flow guiding system with a different geometry can be formed.

In FIGS. 8A and 8B results from a CFD (computational fluid dynamics) simulation are shown. In both views a triangular flow guiding means 4 as depicted e.g. in FIG. 4 is used. FIG. 8A shows a side view, FIG. 8B the complementary top view. The cooling air stream 2 is scooped by the air intake device 1 and impinges onto the triangular base plate 6a (see FIG. 8B). The opening fan-like structure of the flow guiding means 4 results in a diffused flow which impinges on a sidewall of a target region 5 which is here a box-like structure. As best can be seen in the side view of FIG. 8A, the cooling air stream 2 becomes rather undirectional after impinging on the target region, especially underneath the target region. Here, further a flow guiding means 4, in particular under the target region might be able to redirect the cooling air stream 4 back towards the target region 5.

In FIG. 8C further results of CFD simulations are shown. Here the air inlet device 1 is seen from the top located on the side of an aircraft engine 10 (engine axis 30). The cooling air stream 2 is deflected by a flow guiding means 4 which is positioned in a yawed position relative to the air intake device 1. From FIG. 8C it can be seen that this yawed flow guiding means 4 creates a swirl of cooling air 2 engulfing the target region 5. The swirl comprises a turbulent air flow which improving the heat transfer from the target region 5 to the cooling air stream 2.

In FIG. 8D it is shown that not only one first target region 5A can be cooled by the cooling air stream 2, but also two or more. The air intake device 1 is shown here from the front (engine axis perpendicular to paper 30). The air taken in is deflected by a flow guiding means 4 which is positioned in a yawed direction as in FIGS. 5 and 8C. The yawed position results in a swirl 40 which goes around the casing of the aircraft engine 10 shown in FIG. 8D in a frontal cross-section. The path of the swirl of the cooling air stream 2 going around the casing allows to put a second target region 5B into the path for further cooling. In further embodiments, more than two target regions 5A, 5B can be thermally conditioned by the thermal management air stream 2.

In FIG. 9A, 9B and 9C steps in a further manufacturing method for a flow guiding system are shown. Like in first step of the previously described method (FIG. 7A), the first cut 21 in the metal sheet 20 is a straight line which is transformed by an upwards directed pressure (see arrow in FIG. 9B) into an air intake device 1 (see FIG. 9C). The second cut 22 is shaped differently here from the embodiment shown in FIG. 7. Here the two lateral arms of the essentially U-shaped cut 22 are inclined inwards, so that the cut-out opening (see FIG. 9B) has a trapezoidal shape. The cut-out metal part is bent downwards as indicated by the arrow in FIG. 9B. This is about the same procedure as shown in FIGS. 7A and 7B. But in addition, here the sides of the guiding surface 6 are twisted upwards after the bending down. The result is shown in FIG. 9C. The guiding surface 6 has lateral guide plates 6B on either side of the base plate 6A.

Using the principles shown in FIGS. 7 and 9, different shapes of flow guiding systems can be manufactured. In particular the shape of the flow guide surface 6 can be modified, e.g. the metal sheet 20 from which the guiding surface 6 is cut, is curved.

The air intake devices 1 described in the previous embodiments protrudes into the free flowing air stream 3. It is also possible that the flow guiding system uses an air intake device 1 which is recessed from the free flowing air stream 3. In FIGS. 10A and 10B such an embodiment is shown. In FIG. 10B a trapezoidal recessed zone 23 into the metal sheet 20 is shown. This can be manufactured by pressing down a trapezoidal section of the metal sheet 20 along the downward pointing arrows shown in FIG. 10A. As can be seen in FIG. 10B the long baseline of the trapezoidal recessed zone 23 provides an opening forming the mouth of the air intake device 1. Since the air intake device 1 does not protrude into the free flowing air stream 3 (coming in FIG. 10A, 10B from the left), there is less performance penalty due to obstructions. This kind of recessed air intake device 1 can be used with flow guiding means 4 described in the embodiments above. But in one particular embodiment (see FIG. 10C to 10F), the recessed air intake device 1 is manufactured from a metal sheet 20 like the embodiments shown in FIGS. 7 and 9.

In FIG. 10C it is shown that a second cut 22 is made in the metal sheet 20 to provide a guiding surface 6 for the air intake device 1. The shape of the second cut 22 is the same as shown in FIG. 9A. As in the embodiment shown in FIG. 10D the cutout trapezoidal part is bent downwards as indicated by the arrow. FIG. 10E it is shown that the sides of the trapezoidal guiding surface 6 are bent upwards to provide lateral guide plates 6B.

Figure 11B:
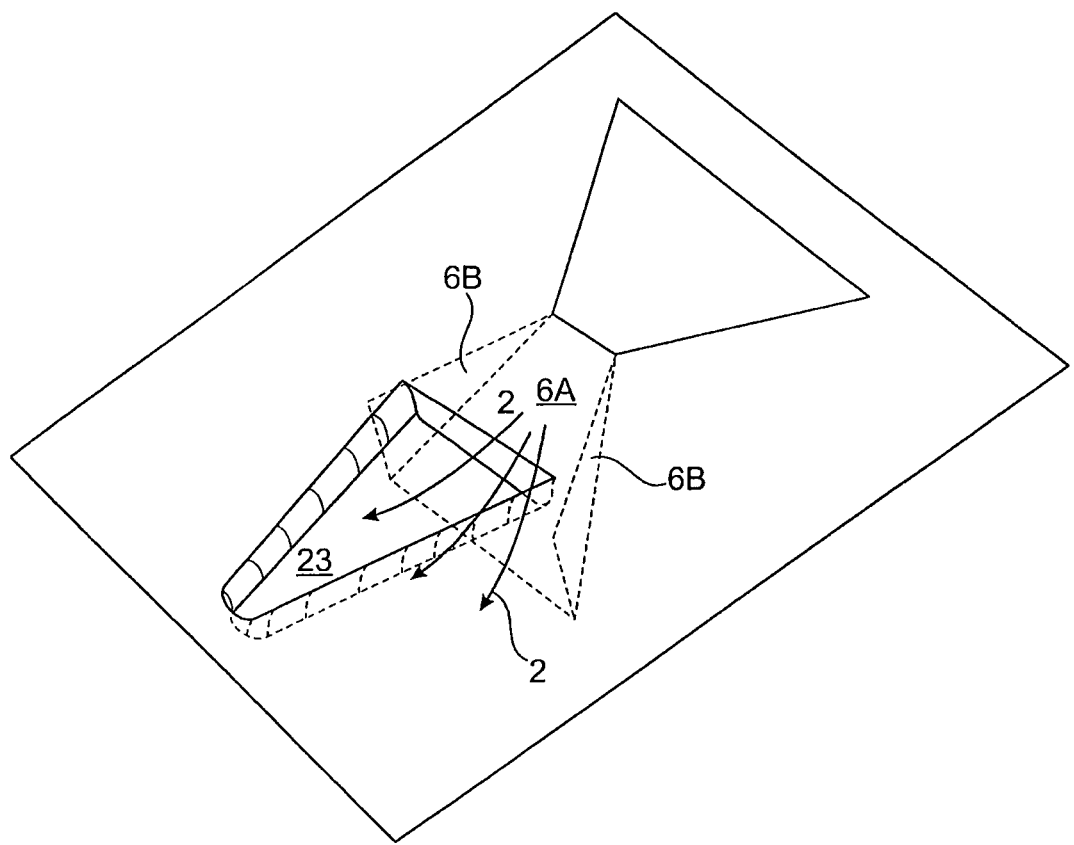

In FIG. 11A the functionality of flow guiding system with a recessed zone 23 is described. A free flowing air stream 3 (e.g. from the bypass duct 13, the free flowing air from outside the turbo engine 10, or a flow from within the turbo engine 10) is flowing towards the short base line of the trapezoidal recessed zone 23. The free flowing air 3 flows along the surface and then into the recessed zone 23 as indicated by the arrows in FIG. 11. Within the recessed zone 23 the flow is directed towards the air intake device 1, i.e. the cut at the long baseline of the trapezoidal recessed zone 23. From the thermal management air flow 2 impinges on the base plate of the guide surface 6A. In FIG. 11 B it is shown how the thermal air management air flow 2 is then directed towards an inner part of the engine 10, i.e. the target region 5.

It will be understood that the trapezoidal recessed zone 23 is just an example for recessed zones 23 which have a different shapes. These recessed zones 23 can be e.g. located in the outer walls to the core 11 of the turbo engine 10 (i.e. the inner wall of the bypass duct 13), in the outer wall of the bypass duct 10 and/or in the outside of the casing of the turbo engine 10. The recessed zone 23 does not have to be manufactured from the metal sheet 20 as shown in FIG. 10.

It is possible to use differently shaped air intake devices 1 on different parts of the turbo engine 10. The shape and location of the air intake devices 1—and therefore the flow guiding system—depends on the best location for deriving a thermal management air flow 2 and the target region 5 for the thermal management.

The embodiments shown above relate to aircraft turbo engines, in particular turbofan engines. Other embodiments—not shown—relate to other turbo engines such as e.g. gas turbines. Flow guide systems with at least one flow guiding means can also be used to cool or heat certain regions within those types of engine. Here also the air intake device 1 were passively subjected to free flowing air streams 3 e.g. in the bypass duct 12. In other embodiments—not shown here—compressors or pumps can be used in connection with the air intake devices 1 to provide thermal management air streams 2 for the turbo engine 10.

REFERENCE LIST 1 air intake device
2 thermal management air stream, cooling air stream
3 free flowing air stream
4 flow guiding means
5 target region
5A first target region
5B second target region
6 guide surface
6A base plate of a guide surface
6B lateral guide plates
7 control system
8 temperature sensor
10 turbo engine
11 core of the turbo engine
12 bypass duct
13 combustion chamber
14 turbine
15 compressor
20 metal sheet
21 first cut in metal sheet
22 second cut in metal sheet
23 recessed zone
30 engine axis
40 swirl

The invention claimed is:
1. A flow guiding system for an aircraft turbo engine, comprising:
   an air intake device including an inlet, an outlet and an enclosed passage between the inlet and the outlet, the inlet being connected to a free flowing air stream during operation of the turbo engine to direct a thermal management air stream from the free flowing air stream, the outlet being positioned in a chamber of the turbo engine,
   a flow guiding device positioned in the chamber spaced apart from the outlet,
   wherein the flow guiding device comprises a guide surface,
   the outlet being oriented toward the flow guiding device so that an axis of flow of the thermal management air stream at the outlet is directed toward the guide surface, and the guide surface is oriented such that the axis of flow is deflected by the guide surface toward a target device in the chamber, such that the thermal management air stream impacts the guide surface and is deflected toward the target device,
   wherein the guide surface is at least one chosen from flat, at least partially flat and at least partially curved.

2. The flow guiding system according to claim 1, wherein the thermal management air stream is a cooling air stream or a heating air stream.

3. The flow guiding system according to claim 1, wherein the free flowing air stream comprises at least one chosen from a bypass stream in a turbofan engine, an air stream taken from a core of the turbo engine and an ambient air stream outside the turbo engine.

4. The flow guiding system according to claim 1, wherein the guide surface includes a triangular base plate and lateral guide plates.

5. The flow guiding system according to claim 4, wherein the axis of flow is directed onto an apex of the triangular base plate so that the thermal management air stream is diffused towards the target device.

6. The flow guiding system according to claim 1, wherein the flow guiding device is integrated into at least one chosen from a part of a surface of a core part of a turbofan engine and a casing radially outside a bypass duct of a turbofan engine.

7. The flow guiding system according to claim 1, wherein the target device includes at least one chosen from an electronic device, a coated section of the turbo engine, a bearing, a core casing, a connector, a plastic part, an actuator for vanes in the turbo engine, a movable part in the turbo engine, a fuel line, an oil line, and a seal of the turbo engine.

8. The flow guiding system according to claim 1, wherein at least one chosen from the air intake device and the guide surface is movable to adjust deflection of the axis of flow and the thermal management air stream.

9. The flow guiding system according to claim 8, and further comprising a control system configured to measure an operating parameter from at least one chosen from shaft speed, an outside temperature, a temperature in a bypass duct, a temperature within a core engine, a temperature in a casing of the turbo engine, a strain measurement from the target device or outside the turbo engine, and the control system is configured to control, based on the operating parameter, at least one chosen from movement of the air intake device, movement of the guide surface and a shape of the guide surface for adjusting the thermal management air flow to achieve a predetermined thermal management target.

10. The flow guiding system according to claim 1, wherein at least one chosen from the air intake device and the flow guiding device is formed from one piece of metal sheet.

11. The flow guiding system according to claim 1, wherein the air intake device protrudes into the free flowing air stream or is recessed from the free flowing air stream.

12. A aircraft turbo engine, including the flow guiding system according to claim 1.

* * * * *